(12) United States Patent
Matalon et al.

(10) Patent No.: US 9,054,866 B2
(45) Date of Patent: Jun. 9, 2015

(54) MULTIMODE DSL LINE DRIVER

(75) Inventors: Nir Matalon, Sunnyvale, CA (US);
Sumant Ranganathan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 2018 days.

(21) Appl. No.: 12/107,626

(22) Filed: Apr. 22, 2008

(65) Prior Publication Data

US 2009/0262791 A1   Oct. 22, 2009

(51) Int. Cl.
*H04M 1/00*   (2006.01)
*H04L 5/14*   (2006.01)
*H04L 25/02*   (2006.01)
*H04L 27/26*   (2006.01)

(52) U.S. Cl.
CPC .......... *H04L 5/1438* (2013.01); *H04L 25/0264* (2013.01); *H04L 25/0272* (2013.01); *H04L 27/2601* (2013.01)

(58) Field of Classification Search
CPC .......... H04Q 3/00; H04M 3/323; H04M 3/30; H04M 11/06; H04M 3/005; H04N 1/32704; H04L 25/4927; H04L 27/361; H04L 5/02; H04L 27/18; H04L 27/2331; H04L 27/1563
USPC .............. 379/9.06, 399.01, 399.02, 9, 16, 17, 379/93.09, 93.14, 100.15; 375/222, 242, 375/269, 273, 279, 280, 328
See application file for complete search history.

(56) References Cited

U.S. PATENT DOCUMENTS

2006/0034359 A1 * 2/2006 Hauptmann et al. .......... 375/222
2006/0171527 A1 * 8/2006 Mills et al. ............... 379/395.01

* cited by examiner

*Primary Examiner* — Akelaw Teshale
(74) *Attorney, Agent, or Firm* — Fiala & Weaver P.L.L.C.

(57) ABSTRACT

A multimode DSL (digital subscriber line) line driver circuit is disclosed. The line driver circuit includes a switch network that enables the line driver circuit to be switched between multiple DSL communication configurations. Upon receipt of a mode control signal, the line driver circuit switches from a first DSL communication configuration to a second communication configuration. A DSL communication signal configured according to the second DSL communication configuration is received at the line driver circuit. The received DSL communication signal is amplified and/or filtered by the line driver circuit. The received DSL communication signal is transmitted from the line driver circuit. In one example implementation, the line driver circuit may be switched from an asymmetric digital subscriber line (ADSL) configuration to a very high speed digital subscriber line (VDSL) configuration, and may be switched from the VDSL configuration to the ADSL configuration.

20 Claims, 7 Drawing Sheets ically, in a DSL system, an Internet service provider (ISP) interfaces with an analog telephone line using a DSL modem. The DSL modem enables the ISP to commu-

MULTIMODE DSL LINE DRIVER

BACKGROUND OF THE INVENTION

1. Field of the Invention

The present invention relates to line drivers used in communication systems, such as in digital subscriber line (DSL) systems.

2. Background Art

DSL (digital subscriber line) technology provides for the digital transmission of data over the wires of a local telephone network. Typically, in a DSL system, an Internet service provider (ISP) interfaces with an analog telephone line using a DSL modem. The DSL modem enables the ISP to communicate with consumers over the analog telephone line. A consumer also interfaces with the analog telephone line using a DSL modem to perform communications with the ISP. The DSL modem of the consumer extracts digital data from the analog telephone line that was transmitted by the ISP, and provides the extracted digital data to a computer of the consumer. Furthermore, the DSL modem of the consumer transmits digital data that was received from the computer to the ISP over the analog telephone line. Typically, the download speed of consumer DSL services ranges from 512 kilobits per second (kbit/sec) to 24,000 kbit/sec, depending on the type of DSL technology.

Various types of DSL technology exist, including Asymmetric Digital Subscriber Line (ADSL) and VHDSL or VDSL (Very High Speed DSL). In ADSL, upstream communication speeds (e.g., for transmissions from the consumer) are lower than downstream communication speeds (e.g., for transmissions from the ISP). With standard ADSL, a frequency band of 25.875 kHz to 138 kHz is used for upstream communications, and a frequency band of 138 kHz-2.2 MHz is used for downstream communications.

VDSL is a newer standard that provides for faster data transmissions than standard DSL or ADSL. For example, VDSL is capable of supporting new high bandwidth applications such as HDTV. Communications according to VDSL are symmetric such that upstream and downstream communications may be performed at the same rates. Second-generation VDSL (VDSL2) systems utilize a bandwidth of up to 30 MHz to provide data rates exceeding 100 Mbit/s in both the upstream and downstream directions. The maximum available bit rate may be achieved at relatively short ranges, such as a range of up to about 300 meters.

As the different types of DSL technologies become more widespread, DSL modems with multi-DSL technology capability are becoming desired. For example, DSL modems that support both the VDSL standard along with the more prevalent ADSL standard are desired. However, to save costs, it is desired for DSL system solutions to use fewer components to reduce the resulting bill of materials (BOM). Such cost pressures are making it more difficult to implement DSL modems with multi-DSL technology capability.

Thus, ways of enabling multi-DSL technology capability in DSL modems, without substantially increasing costs, are desired.

BRIEF SUMMARY OF THE INVENTION

A multimode DSL (digital subscriber line) line driver is disclosed. The line driver circuit includes a switch network that enables the line driver circuit to be switched between DSL communication configurations. For instance, in one configuration, the line driver circuit may be switched from an asymmetric digital subscriber line (ADSL) configuration to a very high speed digital subscriber line (VDSL) configuration, and vice versa.

In an example aspect of the present invention, the line driver circuit receives a mode control signal. The line driver circuit switches from a first DSL communication configuration to a second DSL communication configuration in response to the mode control signal. A DSL communication signal configured according to the second DSL communication configuration is received at the line driver circuit. The received DSL communication signal is transmitted from the line driver circuit.

The line driver circuit may receive a second mode control signal. The line driver circuit switches from the second DSL communication configuration to the first DSL communication configuration in response to the second mode control signal. A second DSL communication signal is received at the line driver circuit that is configured according to the first DSL communication configuration. The second received DSL communication signal is transmitted from the line driver circuit.

In another aspect, a line driver circuit is provided. The line driver circuit includes an amplifier, a first switch, a second switch, a third switch, a first resistor, a second resistor, a third resistor, a fourth resistor, a first capacitor, and a second capacitor. The first switch has a first terminal that is coupled to a first input of the amplifier. The second switch has a first terminal that is coupled to the first input of the amplifier. The third switch has a first terminal that is coupled to a second terminal of the first switch. The first resistor has a first terminal coupled to a second terminal of the first switch. The second resistor is coupled between the second terminal of the first switch and a first output of the amplifier. The third resistor is coupled between a second terminal of the second switch and a second terminal of the third switch. The fourth resistor is coupled between the second terminal of the third switch and the first output of the amplifier. The first capacitor is coupled between the second terminal of the second switch and the first output of the amplifier. The second capacitor has a first terminal coupled to a second terminal of the third switch.

The line driver circuit is configured to be switchable between first and second DSL communication configurations, according to a mode control signal. The first switch receives a first phase of the mode control signal, and the second switch and the third switch receive a second phase of the mode control signal. The first phase of the control signal is configured to open the first switch in a first mode, and to close the first switch in a second mode. The second phase of the control signal is configured to open the second switch and the third switch in the second mode, and to close the second switch and the third switch in the first mode.

In a further aspect, the line driver circuit may be a differential line driver circuit. The line driver circuit may further include a fourth switch, a fifth switch, a sixth switch, a fifth resistor, a sixth resistor, a seventh resistor, an eighth resistor, and a third capacitor. The fourth switch has a first terminal that is coupled to a second input of the amplifier. The fifth switch has a first terminal that is coupled to the second input of the amplifier. The sixth switch has a first terminal that is coupled to a second terminal of the fourth switch. The fifth resistor has a first terminal coupled to a second terminal of the fourth switch. The sixth resistor is coupled between the second terminal of the fourth switch and a second output of the amplifier. The seventh resistor is coupled between a second terminal of the fifth switch and a second terminal of the sixth switch. An eighth resistor is coupled between the second terminal of the sixth switch and the second output of the amplifier. A third capacitor is coupled between the second terminal of the fifth switch and the second output of the amplifier. The second capacitor has a second terminal coupled to a second terminal of the sixth switch.

In a further aspect, the first switch and the fourth switch receive the first phase of the control signal, and the second switch, the third switch, the fifth switch, and the sixth switch receive the second phase of the control signal. The first phase of the control signal is configured to open the first switch and the fourth switch in the first mode, and to close the first switch and the fourth switch in the second mode. The second phase of the control signal is configured to open the second switch, the third switch, the fifth switch, and the sixth switch in the second mode, and to close the second switch, the third switch, the fifth switch, and the sixth switch in the first mode.

In an example implementation, the first mode is an ADSL communication mode, and the second mode is a VDSL communication mode. During the ADSL communication mode, an ADSL standard input signal is received at a second terminal of the first resistor and a second terminal of the fifth resistor. During the VDSL communication mode, a VDSL standard input signal is received at the second terminal of the first resistor and the second terminal of the fifth resistor.

In a further example implementation, the first-sixth switches and the amplifier may be included in an integrated circuit chip.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
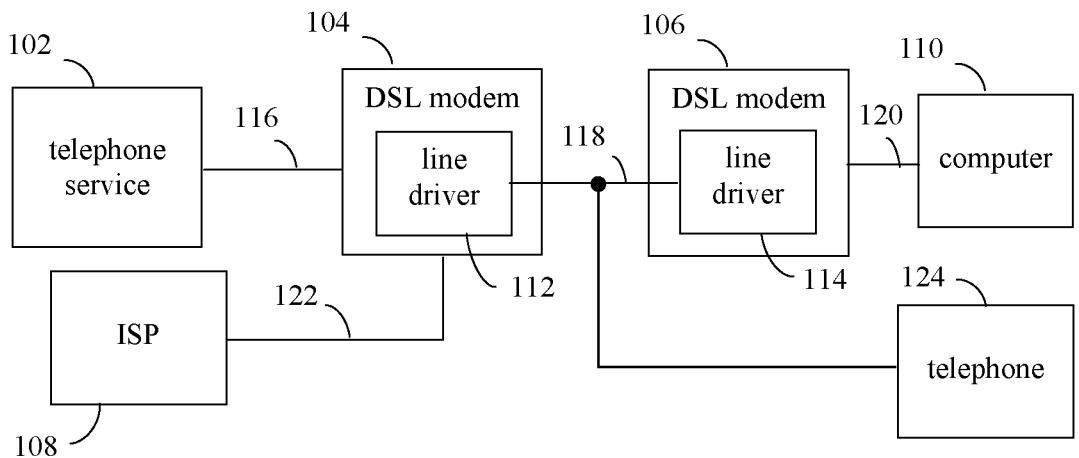
FIG. 1 shows a block diagram of an example communication system that incorporates DSL technology to communicate data.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Example DSL Systems and Line Driver Circuits

DSL (digital subscriber line) technology provides for the digital transmission of data over the wires of a local telephone network. FIG. 1 shows a block diagram of an example communication system 100 that incorporates DSL technology to communicate data. As shown in FIG. 1, system 100 includes a telephone service 102, a first DSL modem 104, a second DSL modem 106, an Internet service provider (ISP) 108, a computer 110, and a telephone 124. In system 100, telephone service 102 is coupled to DSL modem 104 by a first communication interface 116. ISP 108 is coupled to DSL modem 104 by a second communication interface 122. First and second DSL modems 104 and 106 are coupled by a third communication interface 118. Second DSL modem 106 and computer 110 are coupled by a fourth communication interface 120.

Telephone service 102 is a local telephone service provider, such as AT&T, Verizon, etc. First communication interface 116 is a standard analog telephone line interface. Telephone service 102 uses first communication interface 116, which may include one or more analog telephone lines, to provide telephone service to consumers. ISP 108 is an Internet service provider. Second communication interface 122 includes one or more communication lines which transmit digital data. ISP 108 transmits digital data over second communication interface 122 to DSL modem 104. DSL modem 104 enables ISP 108 to communicate the digital data to consumers over a standard analog telephone line. Third communication interface 118 is a standard analog telephone line similar to first communication interface 116. DSL modem 104 transmits the digital data received from ISP 108 over third communication interface 118, along with standard telephone (e.g., voice) signals received from telephone service 102.

A consumer may interface with third communication interface 118 to receive the voice communications from telephone service 102 and/or the digital data from ISP 108, and to transmit voice communications back to telephone service 102 and/or digital data to ISP 108. For example, telephone 124 of the consumer may be used to engage in voice communications through telephone service 102. As shown in FIG. 1, telephone 124 may be coupled to third communication interface 118 to receive and transmit analog voice communications. Furthermore, computer 110 of the consumer may be used to engage in communications with ISP 108 using digital data. DSL modem 106 of the consumer extracts digital data transmitted by ISP 108 (through DSL modem 104) over analog third communication interface 104. DSL modem 106 transmits the digital data to computer 110 over fourth communication interface 120. Fourth communication interface 120 may be any type of DSL modem-to-computer communication link, including an Ethernet link, a USB (universal serial bus) link, or other type of link. DSL modem 106 also enables the consumer to transmit digital data from computer 110 to ISP 108, through analog third communication interface 118 and DSL modem 104.

As shown in FIG. 1, first and second DSL modems 104 and 106 may each include one or more line drivers, such as line drivers 112 and 114, respectively. Line drivers 112 and 114 are transmitter circuits for transmitting digital data onto third communication interface 118. For example, line driver 112 transmits a digital data signal received from ISP 108 onto an analog telephone line of third communication interface 118. Line driver 114 transmits a digital data signal received from computer 110 onto an analog telephone line of third communication interface 118. Line drivers 112 and 114 may perform an amplification function and/or a filtering function on the received digital data signals.

DSL modems 104 and 106 may be configured according to various types of DSL technologies, including Asymmetric Digital Subscriber Line (ADSL) and VDSL (Very High Speed DSL) (also known as VHDSL). In ADSL, upstream communication speeds (e.g., for transmissions from computer 110 to ISP 108) are lower than downstream communication speeds (e.g., for transmissions from ISP 108 to computer 110). With standard ADSL, a frequency band of 25.875 kHz to 138 kHz is used for upstream communications, and a frequency band of 138 kHz-2.2 MHz is used for downstream communications.

VDSL provides for faster data transmissions than standard DSL or ADSL. For example, VDSL is capable of supporting high bandwidth applications such as HDTV. Communications according to VDSL are symmetric such that upstream and downstream communications may be performed at the same rates. Second-generation VDSL (VDSL2) systems utilize bandwidth of up to 30 MHz to provide data rates exceeding 100 Mbit/s simultaneously in both the upstream and downstream directions. The maximum available bit rate may be achieved at a range of up to about 300 meters.

Figure 2:
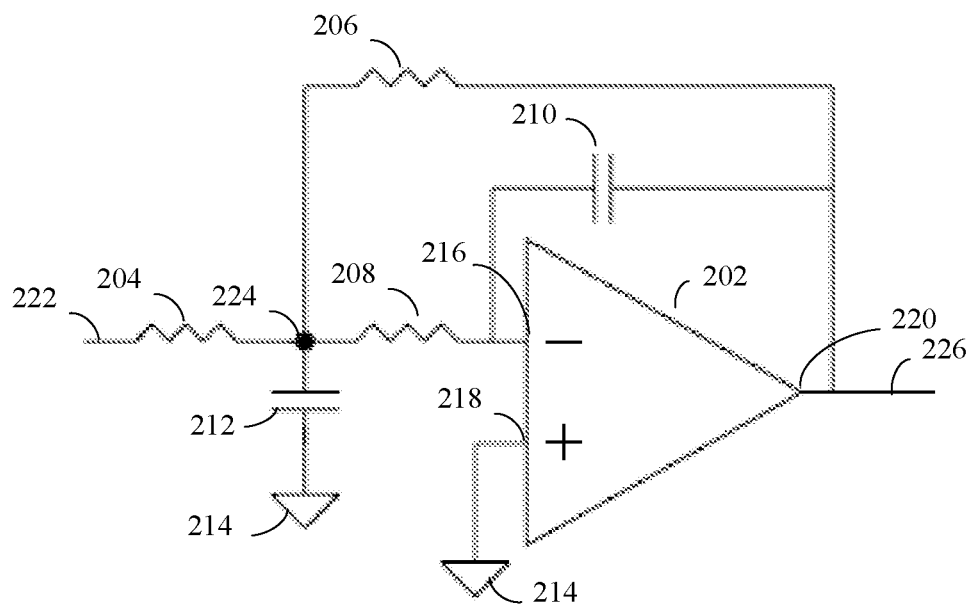
FIG. 2 shows an example line driver circuit that may be used in an ADSL communication system.

Traditional line drivers have utilized an integrated high-linearity class A/B or higher class operational amplifier, with appropriate passive components (e.g., resistors, capacitors) mounted adjacent to the amplifier on a circuit board (e.g., a printed circuit board). The passive components set an appropriate gain level for the amplifier, and for ADSL, they also form a low pass filter. One requirement for the ADSL standard is that the upstream signal from a line driver (e.g., line driver 114) does not corrupt the downstream frequency band both in the form of out-of-frequency-band spurs and noise. To achieve this, a second order, or higher order, low pass filter may implemented by the line driver to suppress these out-of-band spurs and noise. For instance, FIG. 2 shows an example line driver circuit 200 having a second order filter configuration that may be used in an ADSL communication system. As shown in FIG. 2, line driver circuit 200 includes an operational amplifier 202, a first resistor 204, a second resistor 206, a third resistor 208, a first capacitor 210, and a second capacitor 212.

Amplifier 202 has first and second inputs 216 and 218, and an output 220. In the example of FIG. 2, first input 216 is an inverting input of amplifier 202, and second input 218 is a non-inverting input of amplifier 202. Second input 218 is coupled to a ground signal 214. A first terminal of first resistor 204 receives an input signal 222. A second terminal of first resistor 204 is coupled to a circuit node 224. A first terminal of second capacitor 212, a first terminal of second resistor 206, and a first terminal of third resistor 208 are coupled to node 224. A second terminal of second capacitor 212 is coupled to ground signal 214. A second terminal of third resistor 208 and a first terminal of first capacitor 210 are coupled to first input 216 of amplifier 216. A second terminal of second resistor 206 and a second terminal of first capacitor 210 are coupled to output 220 of amplifier 202. An output signal 226 is generated at output 220 of amplifier 202.

As will be known to persons skilled in the relevant art(s), the low frequency gain (LFG) of line driver circuit 200 may be calculated according to Equation 1 shown as follows:

$$\text{LFG} = \text{value of second resistor 206/value of first resistor 204} \qquad \text{Equation 1}$$

Good linearity in the upstream path (e.g., >90 dB) can be achieved using line driver circuit 200 in an ADSL communication mode. A reasonable unity gain bandwidth of 10-50 MHz may be achieved, which is significantly higher than an ADSL operating frequency (e.g., 25.875 kHz to 138 kHz), resulting in large loop gain values around 138 kHz. Additional signal processing techniques, such as nested miller compensation, may be used to further improve linearity. Sufficiently low noise, however, is much more difficult to achieve, particularly in CMOS (complementary metal-oxide-semiconductor) implementations for amplifier 202, where flicker noise plays a very large role at frequencies around 138 kHz. One way to decrease a noise contribution by amplifier 202 is to maximize a signal swing of input signal 222 to line driver circuit 200 (in other words, to minimize the required close loop gain).

The VDSL standard is a superset of the ADSL standard, because the VDSL standard incorporates the 25 kHz-138 kHz frequency band for upstream communications, along with additional frequency bands up to 12 MHz. Because typical wire lengths (e.g., length of telephone lines of third communication interface 118) for VDSL communications are shorter than those in ADSL communications, the sensitivity requirement for VDSL is much less stringent, and thus a filter is not required. However, VDSL has a higher power requirement for signals as compared to ADSL, and thus a larger amplifier gain is required.

Figure 3:
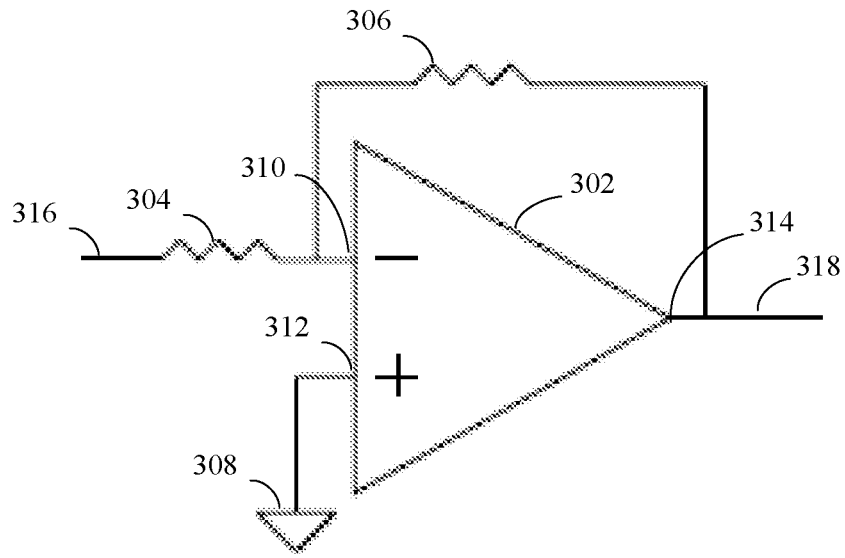
FIG. 3 shows an example line driver circuit that may be used in a VDSL communication system.

FIG. 3 shows an example line driver circuit 300 that may be used in a VDSL communication system. As shown in FIG. 3, line driver circuit 300 includes an operational amplifier 302, a first resistor 304, and a second resistor 306. Amplifier 302 has first and second inputs 310 and 312, and an output 314. In the example of FIG. 3, first input 310 is an inverting input of amplifier 302, and second input 312 is a non-inverting input of amplifier 302. Second input 312 is coupled to a ground signal 308. A first terminal of first resistor 304 receives an input signal 316. A second terminal of first resistor 304 is coupled to first input 310 of amplifier 302. A first terminal of second resistor 306 is coupled to first input 310 of amplifier 302. A second terminal of second resistor 306 is coupled to output 314 of amplifier 302. An output signal 318 is generated at output 314 of amplifier 302.

As will be known to persons skilled in the relevant art(s), the low frequency gain (LFG) of line driver circuit 300 may be calculated according to Equation 2 shown as follows:

$$\text{LFG} = \text{value of second resistor 306/value of first resistor 304} \qquad \text{Equation 2}$$

As the different types of DSL technologies become more widespread, it is becoming desirable for DSL modems, such as DSL modems 104 and 106, to be capable of transmitting multiple types of DSL signals. For example, it may be desired for one or both of DSL modems 104 to be capable of communicating according to both of the ADSL and VDSL standards. However, to save costs, it is desired for DSL modems to use fewer components to reduce the resulting bill of materials (BOM).

Embodiments of the present invention are described below that enable DSL modems to handle multiple DSL communication standards, without substantially increasing component counts and associated costs.

Example Line Driver Embodiments

Embodiments of the present invention enable DSL modems, such as DSL modems 104 and 106, to handle multiple DSL communication standards, without substantially increasing component counts and associated costs. Example line driver circuits are described below that may be implemented in DSL modems 104 and 106, and that are capable of communicating according to multiple DSL standards. In an embodiment, a line driver circuit includes a switch network that enables the line driver to switch from a first DSL configuration to a second DSL configuration. Thus, such embodiments enable a DSL modem to handle multiple DSL standards. Furthermore, in an embodiment, the switch network may be integrated with an amplifier of the line driver circuit in an integrated circuit chip (e.g., a CMOS chip) so that an overall component count is not substantially increased. Switches of the switch network may have improved performance when integrated in a chip relative to non-integrated switches.

Figure 4:
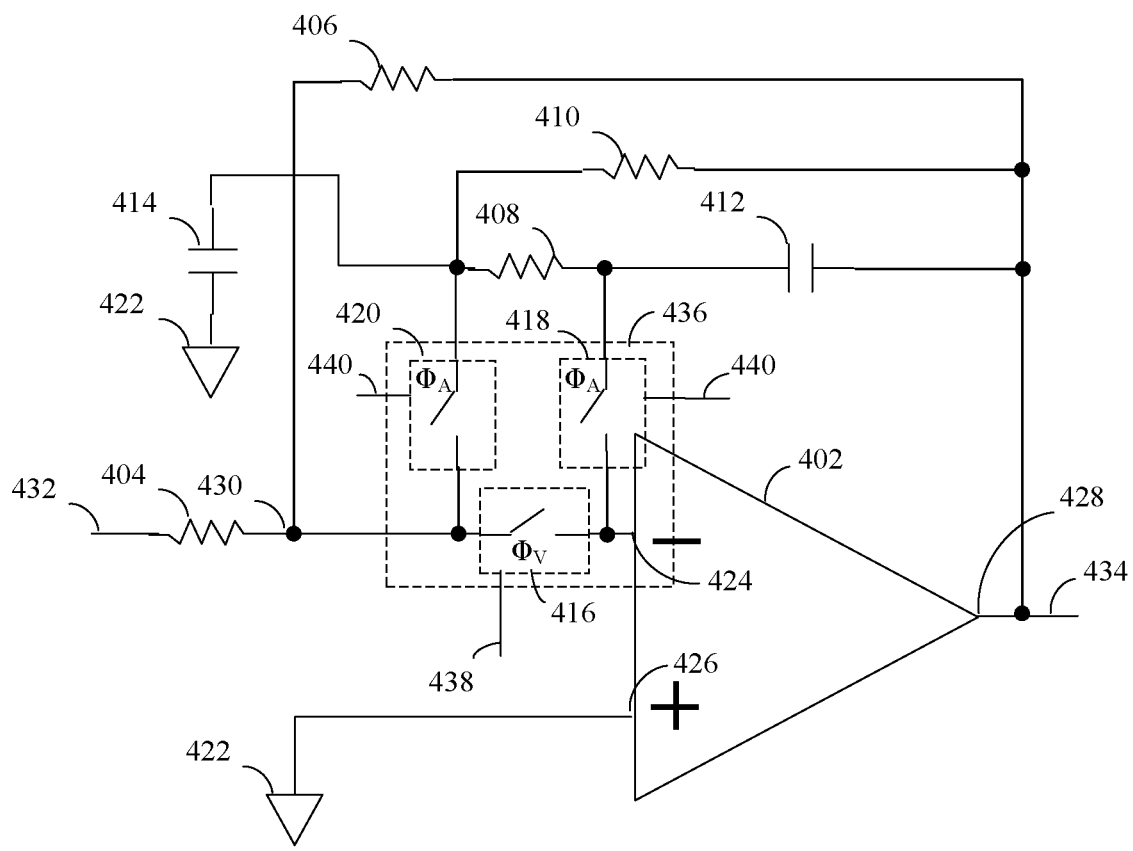
FIG. 4 shows a line driver circuit, according to an example embodiment of the present invention.

FIG. 4 shows a line driver circuit 400, according to an example embodiment of the present invention. As shown in FIG. 4, line driver circuit 400 includes a first resistor 404, a second resistor 406, a third resistor 408, a fourth resistor 410, a first capacitor 412, a second capacitor 414, a first switch 416, a second switch 418, and a third switch 420. First-third switches 416, 418, and 420 form a switch network 436. Switch network 436 enables line driver circuit 400 to switch between ADSL and VDSL configurations similar to line driver circuits 200 and 300 shown in FIGS. 2 and 3, respectively. Line driver circuit 400 is described as follows.

Amplifier 402 has first and second inputs 424 and 426, and an output 428. In the example of FIG. 4, first input 424 is an inverting input of amplifier 402, and second input 426 is a non-inverting input of amplifier 402. Second input 426 is coupled to a ground signal 422. First switch 416 has a first terminal that is coupled to first input 424 of amplifier 402. Second switch 418 has a first terminal that is coupled to first input 424 of amplifier 402. Third switch 420 has a first terminal that is coupled to a second terminal of first switch 416. First resistor 404 has a first terminal coupled to a second terminal of first switch 416. Second resistor 406 is coupled between the second terminal of first switch 416 and output 428 of amplifier 402. Third resistor 408 is coupled between a second terminal of second switch 418 and a second terminal of third switch 420. Fourth resistor 410 is coupled between the second terminal of third switch 420 and output 428 of amplifier 402. First capacitor 412 is coupled between the second terminal of second switch 418 and the output of amplifier 402. Second capacitor 414 has a first terminal coupled to second terminal of third switch 420. A second terminal of second capacitor 414 is coupled to ground signal 422. An output signal 434 is generated at output 428 of amplifier 402. Note that first resistor 404, second resistor 406, first switch 416, and third switch 420 each have a terminal coupled to a first node 430 of line driver circuit 400.

Figure 5:
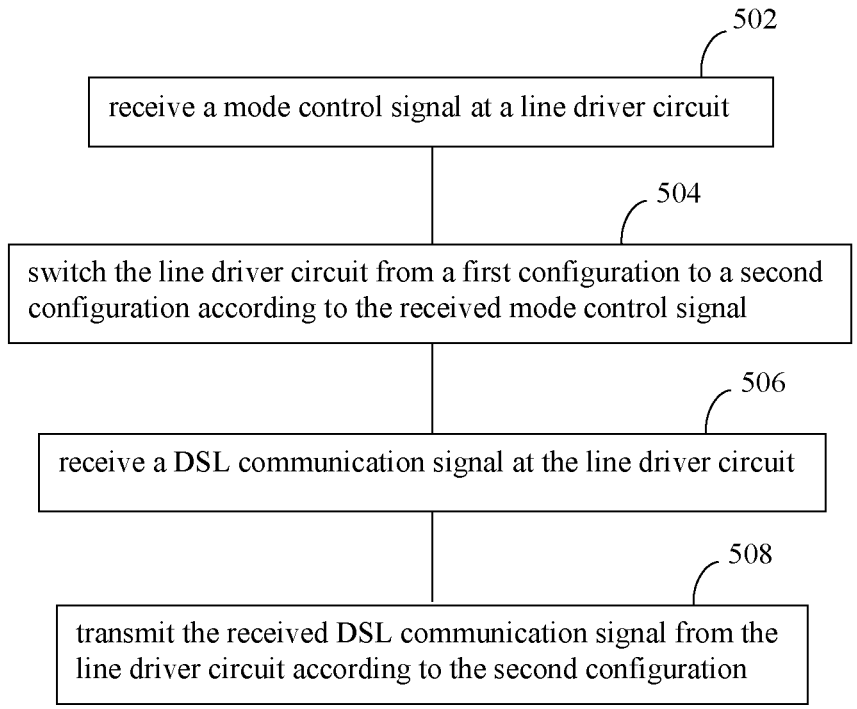
FIG. 5 shows a flowchart for driving a DSL communication signal, according to an embodiment of the present invention.

Line driver circuit 400 is switchable between multiple DSL communication modes, such that line driver circuit 400 can transmit multiple types of DSL communication signals. For example, FIG. 5 shows a flowchart 500 for driving a DSL communication signal, according to an embodiment of the present invention. Line driver circuit 400 may operate according to flowchart 500 to transmit multiple types of DSL communication signals. Other structural and operational embodiments will be apparent to persons skilled in the relevant art(s) based on the discussion regarding flowchart 500. Flowchart 500 is described as follows.

Flowchart 500 begins with step 502. In step 502, a mode control signal is received at a line driver circuit. For example, as shown in FIG. 4, a first control signal phase 438 is received by first switch 416, and a second control signal phase 440 is received by second and third switches 418 and 420. First and second control signal phases 438 and 440 are opposing phases of a mode control signal for line driver circuit 400. First and second control signal phases 438 and 440 control an opening and closing of first-third switches 416, 418, and 420, and thus determine a circuit configuration for line driver circuit 400.

Figure 6:
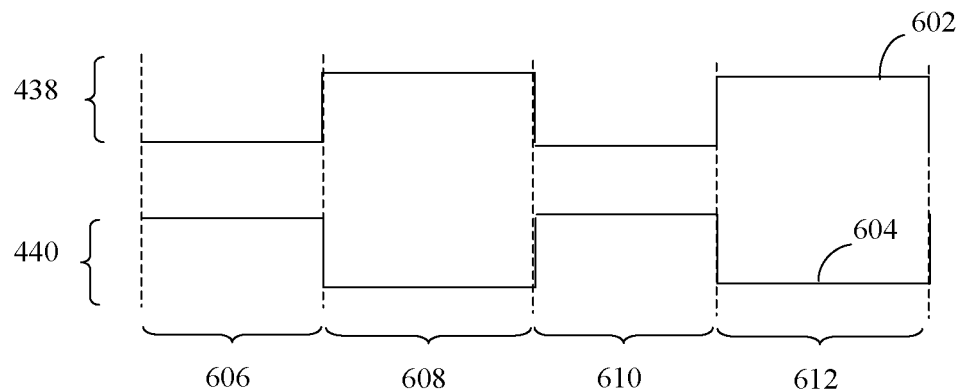
FIG. 6 shows a timing diagram illustrating a control signal phase relationship for a line driver circuit, according to an example embodiment of the present invention.

For instance, FIG. 6 shows a timing diagram 600 illustrating a phase relationship for first and second control signal phases 438 and 440, according to an example embodiment of the present invention. FIG. 6 shows a first timing waveform 602 and a second timing waveform 604. First timing waveform 602 corresponds to first control signal phase 438 and second timing waveform 604 corresponds to second control signal phase 440. Four time periods 606, 608, 610, and 612 are shown in FIG. 6 for first and second timing waveforms 602 and 604, for illustrative purposes. As indicated in FIG. 6, first and second control signal phases 438 and 440 are opposing phases. When first timing waveform 602 is high (second and fourth time periods 608 and 612), second waveform 604 is low, and when first timing waveform 602 is low (first and third time periods 606 and 610), second waveform 604 is high.

As described above, first and second control signal phases 438 and 440 may be opposing phases of a mode control signal. For instance, first and second control signal phases 438 and 440 may be generated from a mode control signal by generating an inverted and a non-inverted version of the mode control signal. First and second control signal phases 438 and 440 may be generated in other ways, as would be known to persons skilled in the relevant art(s).

In step 504, the line driver circuit is switched from a first configuration to a second configuration according to the received mode control signal. In an embodiment, first and second control signal phases 438 and 440 may be configured to switch line driver circuit 400 from an ADSL configuration to a VDSL configuration, and from a VDSL configuration to an ADSL configuration, by appropriately closing and opening first-third switches 416, 418, and 420.

In the example of FIG. 6, when first timing waveform 602 is high, first switch 416 is closed (conducting). When first timing waveform 602 is low, first switch 416 is open (not conducting). When second timing waveform 604 is high, second and third switches 418 and 420 are closed. When second timing waveform 604 is low, second and third switches 418 and 420 are open. Thus, when first switch 416 is open, and second and third switches 418 and 420 are closed, line driver circuit 400 is configured in an ADSL configuration or mode. When first switch 416 is closed, and second and third switches 418 and 420 are open, line driver circuit 400 is configured in a VDSL configuration or mode.

For example, during first time period 606, first switch 416 is open and second and third switches 418 and 420 are closed, such that line driver circuit 400 is configured in an ADSL configuration, similar to line driver circuit 200 shown in FIG. 2. When first switch 416 is open and second and third switches 418 and 420 are closed, line driver circuit 400 is configured similarly to line driver circuit 200, where first resistor 404, second resistor 406 (in parallel with fourth resistor 410), third resistor 408, first capacitor 412, and second capacitor 414 of line driver circuit 400 correspond to first resistor 204, second resistor 206, third resistor 208, first capacitor 210, and second capacitor 212 of line driver circuit 200, being interconnected in a similar fashion.

Alternatively, as shown in FIG. 6, during second time period 608, first switch 416 is closed and second and third switches 418 and 420 are open, such that line driver circuit 400 is configured in an VDSL configuration, similar to line driver circuit 300 shown in FIG. 3. When first switch 416 is closed and second and third switches 418 and 420 are open, line driver circuit 400 is configured similarly to line driver circuit 300, where first resistor 404 and second resistor 406 correspond to first resistor 304 and second resistor 306 of line driver circuit 200, being interconnected in a similar fashion.

Thus, in embodiments, line driver circuit 400 may be switched from a first configuration to a second configuration according to the received mode control signal. For instance, line driver circuit 400 may be switched from an ADSL configuration similar to line driver circuit 200 shown in FIG. 2, to a VDSL configuration similar to line driver circuit 300 shown in FIG. 3, according to first and second control signal phases 438 and 440. In such a case, first control signal phase 438 may transition from low to high, and second control signal phase 440 may transition from high to low, to switch line driver circuit 400 from an ADSL configuration to a VDSL configuration. Line driver circuit 400 may also be switched from a VDSL configuration (e.g., FIG. 3), to an ADSL configuration (e.g., FIG. 2), according to first and second control signal phases 438 and 440. In such a case, first control signal phase 438 may transition from high to low, and second control signal phase 440 may transition from low to high, to switch line driver circuit 400 from a VDSL configuration to an ADSL configuration. Switching line driver circuit 400 from an ADSL configuration to a VDSL configuration, or from a VDSL configuration to an ADSL configuration, results in a corresponding change in the gain and/or filter response of line driver circuit 400, as described for the VDSL and ADSL modes elsewhere herein.

In step 506, a DSL communication signal is received at the line driver circuit. As shown in FIG. 4, an input signal 432 is received at a second terminal of first resistor 404. Input signal 432 is a DSL communication signal, such as an ADSL standard communication signal or a VDSL standard communication signal.

In step 508, the received DSL communication signal is transmitted from the line driver circuit according to the second configuration. As shown in FIG. 4, an output signal 434 is transmitted from line driver circuit 400. If input signal 432 is a VDSL standard communication signal, line driver circuit 400 is configured in a VDSL configuration (e.g., in step 504), and output signal 434 is a VDSL standard communication signal. If input signal 432 is an ADSL communication signal, line driver circuit 400 is configured in an ADSL configuration (e.g., in step 504), and output signal 434 is an ADSL standard communication signal. Furthermore, output signal 4343 may be an amplified and/or filtered version of input signal 432.

For example, in an embodiment where input signal 432 is a VDSL standard communication signal, and line driver circuit 400 is in a VDSL configuration (e.g., first control signal phase 438 is high and second control signal phase 440 is low), line driver circuit 400 may generate output signal 434 by amplifying input signal 432 according to the low frequency gain (LFG) indicated by Equation 3:

LFG=value of second resistor 406/value of first resistor 404     Equation 3

Furthermore, the VDSL configuration for line driver circuit 400 shown in FIG. 4 does not enable active filtering, which is not required for VDSL.

In an embodiment where input signal 432 is an ADSL standard communication signal, and line driver circuit 400 is in an ADSL configuration (e.g., first control signal phase 438 is low and second control signal phase 440 is high), line driver circuit 400 may generate output signal 434 by amplifying input signal 432 according to the low frequency gain (LFG) indicated by Equation 4:

$$LFG = \frac{\left(\begin{array}{c}\text{value of second resistor 406 }\|\\ \text{value of fourth resistor 410}\end{array}\right)}{\text{value of first resistor 404}} \quad \text{Equation 4}$$

Because in Equation 4, the numerator is a parallel resistance of second and fourth resistors 406 and 410 (versus the value of resistor 406 in Equation 3), the numerator of Equation 4 is a lower value than the value of the numerator of Equation 3. Thus, the low frequency gain in an ADSL configuration for line driver circuit 400 is lower than a low frequency gain in a VDSL configuration for line driver circuit 400. As indicated above, VDSL has a higher power requirement for signals as compared to ADSL, and thus a larger amplifier gain may be used for VDSL configurations.

Furthermore, the ADSL configuration for line driver circuit 400 includes a second order filter, similar to line driver circuit 200 shown in FIG. 2. As described above, a filter may be used in ADSL configurations so that the upstream signal from a line driver does not corrupt the downstream frequency band both in the form of out-of-frequency-band spurs and noise. The filter provided by line driver circuit 400 in an ADSL configuration may be the second order filter configuration shown in FIG. 2, may be an alternative second order filter configuration, or may another filter configuration, including a filter configuration having an order higher than second order.

Figure 7:
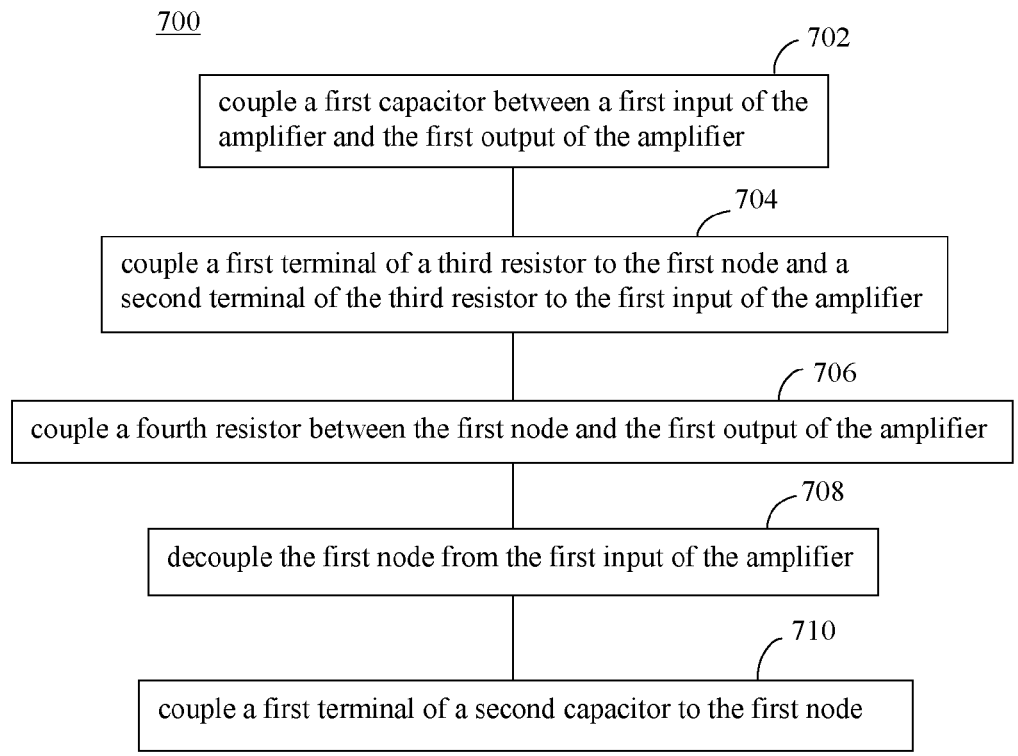
FIGS. 7 and 8 show flowcharts illustrating the interconnecting of components of the line driver circuit of FIG. 4 when switching between DSL standards, according to embodiments of the present invention.
Figure 8:
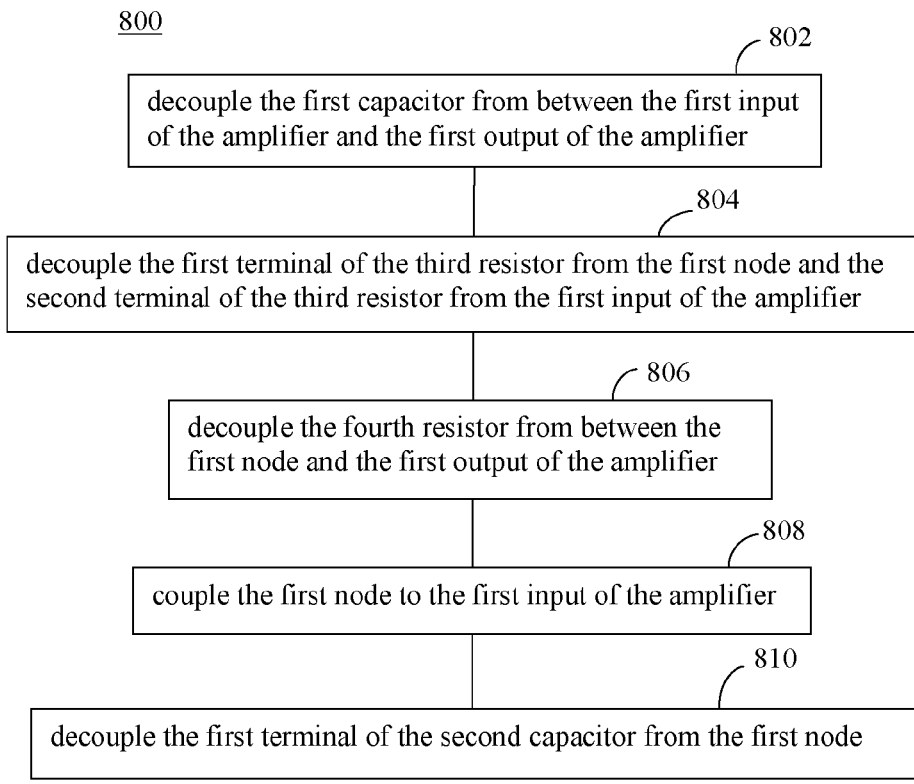

The embodiment of line driver circuit 400 shown in FIG. 4 provides an integrated solution for multiple DSL communication standards, by enabling switching between ADSL and VDSL communication standards. FIGS. 7 and 8 show flowcharts 700 and 800 illustrating the interconnecting of the components of line driver circuit 400 when switching between the ADSL and VDSL standards (in step 504 of flowchart 500), according to embodiments of the present invention. Flowchart 700 illustrates switching from a VDSL circuit configuration to an ADSL circuit configuration, and flowchart 800 illustrates switching from the ADSL circuit configuration to the VDSL circuit configuration for line driver circuit 400. Note that the steps of flowcharts 700 and 800 do not necessarily have to occur in the respective orders shown, and may occur simultaneously in embodiments. Flowcharts 700 and 800 are described as follows.

Flowchart 700 describes the switching of line driver circuit 400 from a VDSL circuit configuration to an ADSL circuit configuration. In step 702 of flowchart 700, a first capacitor is coupled between a first input of the amplifier and the first output of the amplifier. As shown in FIG. 4, the closing of first switch 416 couples first capacitor 412 between first input 424 and output 428 of amplifier 402.

In step 704, a first terminal of a third resistor is coupled to the first node and a second terminal of the third resistor is coupled to the first input of the amplifier. As shown in FIG. 4, closing switch 420 couples a first terminal of third resistor 408 to first node 430, and closing switch 418 couples a second terminal of third resistor 408 to first input 424 of amplifier 402.

In step 706, a fourth resistor is coupled between the first node and the first output of the amplifier. As shown in FIG. 4, closing switch 420 couples resistor 410 between first node 430 and output 428 of amplifier 402.

In step 708, the first node is decoupled from the first input of the amplifier. As shown in FIG. 4, opening switch 416 decouples first node 430 from first input 424 of amplifier 402.

In step 710, a first terminal of a second capacitor is coupled to the first node. As shown in FIG. 4, closing switch 420 couples a first terminal of second capacitor 414 to first node 430.

Upon performing of flowchart 700, line driver circuit 400 is switched from a VDSL circuit configuration to an ADSL circuit configuration, and may receive and process ADSL standard input signals.

Flowchart 800 describes the switching of line driver circuit 400 from an ADSL circuit configuration to a VDSL circuit configuration. In step 802, the first capacitor is decoupled from between the first input of the amplifier and the first output of the amplifier. As shown in FIG. 4, the opening of first switch 416 decouples first capacitor 412 from between first input 424 and output 428 of amplifier 402.

In step 804, the first terminal of the third resistor is decoupled from the first node and the second terminal of the third resistor is decoupled from the first input of the amplifier. As shown in FIG. 4, opening switch 420 decouples the first terminal of third resistor 408 from first node 430, and opening switch 418 decouples the second terminal of third resistor 408 from first input 424 of amplifier 402.

In step 806, the fourth resistor is decoupled from between the first node and the first output of the amplifier. As shown in FIG. 4, opening switch 420 decouples resistor 410 from between first node 430 and output 428 of amplifier 402.

In step 808, the first node is coupled to the first input of the amplifier. As shown in FIG. 4, closing switch 416 couples first node 430 to first input 424 of amplifier 402.

In step 810, the first terminal of the second capacitor is decoupled from the first node. As shown in FIG. 4, opening switch 420 decouples the first terminal of second capacitor 414 from first node 430.

Upon performing flowchart 800, line driver circuit 400 is switched from an ADSL circuit configuration to a VDSL circuit configuration, and may receive and process VDSL standard input signals.

Figure 9:
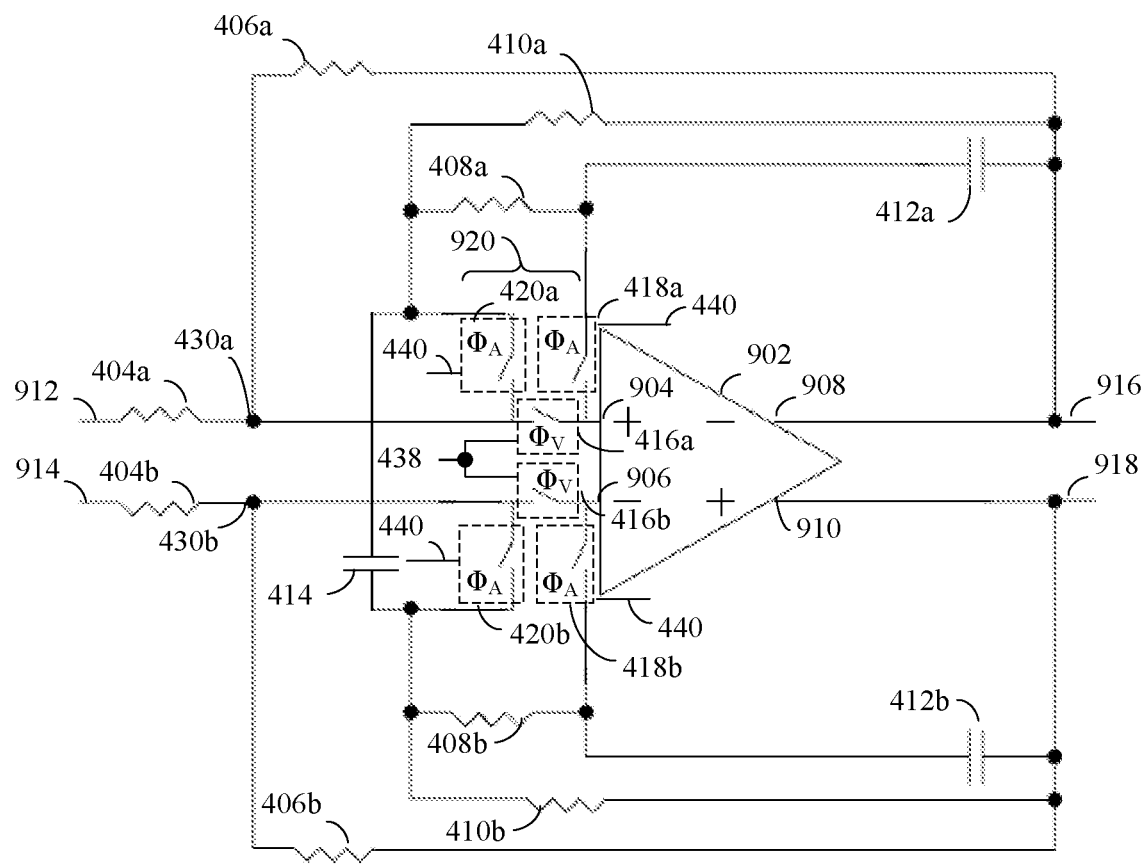
FIG. 9 shows a differential line driver circuit, according to an example embodiment of the present invention.

FIG. 4 shows a single-ended output embodiment for a line driver circuit having multi-DSL standard capability. Embodiments of the present invention also include differential embodiments for line driver circuits having multi-DSL standard capability. For example, FIG. 9 shows a line driver circuit 900, according to an embodiment of the present invention. Line driver circuit 900 includes a differential amplifier 902, and is configured to receive and transmit differential signals that include DSL content. Differential amplifier 902 has first and second inputs 904 and 906, and first and second outputs 908 and 910. In the example of FIG. 4, first input 904 is a non-inverting input of amplifier 902, and second input 906 is an inverting input of amplifier 902. First output 908 is an inverting output of amplifier 902, and second output 910 is a non-inverting output of amplifier 902.

As shown in FIG. 9, line driver circuit 900 includes amplifier 902, a first resistor 404a, a second resistor 406a, a third resistor 408a, a fourth resistor 410a, a first capacitor 412a, a second capacitor 414a, a first switch 416a, a second switch 418a, a third switch 420a, a fifth resistor 404b, a sixth resistor 406b, a seventh resistor 408b, an eighth resistor 410b, a third capacitor 412b, a fourth switch 416b, a fifth switch 418b, and a sixth switch 420b. First-sixth switches 416a, 416b, 418a, 418b, 420a, and 420b form a switch network 920. Switch network 920 enables line driver circuit 900 to switch between ADSL and VDSL configurations similar to line driver circuits 200 and 300 shown in FIGS. 2 and 3, respectively. Line driver circuit 900 is described as follows.

First resistor 404a, second resistor 406a, third resistor 408a, fourth resistor 410a, first capacitor 412a, second capacitor 414, first switch 416a, second switch 418a, and third switch 420a are interconnected with first input 904 and first output 908 of amplifier 902 in a similar manner as first resistor 404, second resistor 406, third resistor 408, fourth resistor 410, first capacitor 412, second capacitor 414, first switch 416, second switch 418, and third switch 420 are interconnected with first input 424 and first output 428 of amplifier 402 shown in FIG. 4. Similarly, fifth resistor 404b, sixth resistor 406b, seventh resistor 408b, eighth resistor 410b, third capacitor 412b, second capacitor 414, fourth switch 416b, fifth switch 418b, and sixth switch 420b are interconnected with second input 906 and second output 910 of amplifier 902 in a similar manner as first resistor 404, second resistor 406, third resistor 408, fourth resistor 410, first capacitor 412, second capacitor 414, first switch 416, second switch 418, and third switch 420 are interconnected with first input 424 and first output 428 of amplifier 402 shown in FIG. 4. Thus, the interconnection of these elements of line driver circuit 900 is not repeated, for purposes of brevity.

Note that first resistor 404a, second resistor 406a, first switch 416a, and third switch 420a each have a terminal coupled to a first node 430a of line driver circuit 900. Likewise, fifth resistor 404b, sixth resistor 406b, first switch 416b, and third switch 420b each have a terminal coupled to a second node 430b of line driver circuit 900.

Line driver circuit 900 is switchable between multiple DSL communication modes, such that line driver circuit 900 can transmit multiple types of DSL communication signals. For example, line driver circuit 900 may operate according to flowchart 500 described above to transmit multiple types of DSL communication signals. For example, as shown in FIG. 9, first and second control signal phases 438 and 440 are received by line driver circuit 900 (step 502 of flowchart 500). First and second control signal phases 438 and 440 may be configured to switch line driver circuit 900 from a first DSL communication mode to a second DSL communication mode (step 504 of flowchart 500), in a similar fashion to line driver circuit 400 described above.

For instance, first and second control signal phases 438 and 440 may be configured to switch line driver circuit 900 from an ADSL configuration to a VDSL configuration, and from a VDSL configuration to an ADSL configuration, by appropriately closing and opening first-sixth switches 416a, 418a, 420a, 416b, 418b, and 420b. First switch 416a and third switch 416b receive first control signal phase 438, and second switch 418a, third switch 418a, fifth switch 418b, and sixth switch 420b receive second control signal phase 440. When first switch 416a and fourth switch 416b are open, and second switch 418a, third switch 420a, fifth switch 418b, and sixth switch 420b are closed, line driver circuit 900 is in an ADSL configuration. When first switch 416a and fourth switch 416b are closed, and second switch 418a, third switch 420a, fifth switch 418b, and sixth switch 420b are opened, line driver circuit 900 is in a VDSL configuration.

A DSL communication signal may be received by line driver circuit 900 (FIG. 506 of flowchart 500). As shown in FIG. 9, a differential input signal may be received by line driver circuit 900 as first and second input signal components 912 and 914, which are received at a second terminal of first resistor 404a and at a second terminal of fifth resistor 404b, respectively. The differential input signal is a differential DSL communication signal, such as an ADSL standard communication signal or a VDSL standard communication signal.

The received DSL communication signal is transmitted by line driver circuit 900 (step 508 of flowchart 500) according to the second configuration selected in step 504. As shown in FIG. 9, a differential output signal may be transmitted from first and second outputs 908 and 910 of line driver circuit 900 as first and second output signal components 916 and 918, respectively. The differential output signal is a DSL communication signal, such as an ADSL standard communication signal or a VDSL standard communication signal, which may be an amplified and/or filtered version of the differential input signal.

For example, in an embodiment where the input signal is a VDSL standard communication signal, and line driver circuit 900 is in a VDSL configuration (e.g., first control signal phase 438 is high and second control signal phase 440 is low), line driver circuit 900 may generate the output signal by amplifying the input signal (e.g., amplifying each of first and second input signal components 912 and 914) according to the low frequency gain (LFG) indicated by Equation 3 above. Furthermore, the VDSL configuration for line driver circuit 900 shown in FIG. 9 does not provide active filtering, which is not required for VDSL.

In an embodiment where the input signal is an ADSL standard communication signal, and line driver circuit 900 is in an ADSL configuration (e.g., first control signal phase 438 is low and second control signal phase 440 is high), line driver circuit 900 may generate the output signal by amplifying each of first and second input signal components 912 and 914 according to the low frequency gain (LFG) indicated by Equation 4 above (e.g., at a lower gain value than for the VDSL configuration). Furthermore, the ADSL configuration for line driver circuit 900 includes a second order filter, similar to line driver circuit 200 shown in FIG. 2. Thus, line driver circuit 900 may generate the output signal by filtering each of first and second input signal components 912 and 914 according to the corresponding second order filter. The embodiment of line driver circuit 900 shown in FIG. 9 provides an integrated solution for multiple DSL communication standards, by enabling switching between ADSL and VDSL communication standards.

Line driver circuits 400 and 900 may each be implemented in a variety of ways. For example, the resistors, capacitors, and amplifiers of each of line driver circuits 400 and 900 may be implemented as separate component on a circuit board (e.g. a printed circuit board (PCB) or printed wire board PWB)), or may be implemented in an integrated manner, with some or all of the resistors, capacitors, and amplifiers of each of line driver circuits 400 and 900 integrated in one or more integrated circuit chips.

Figure 10:
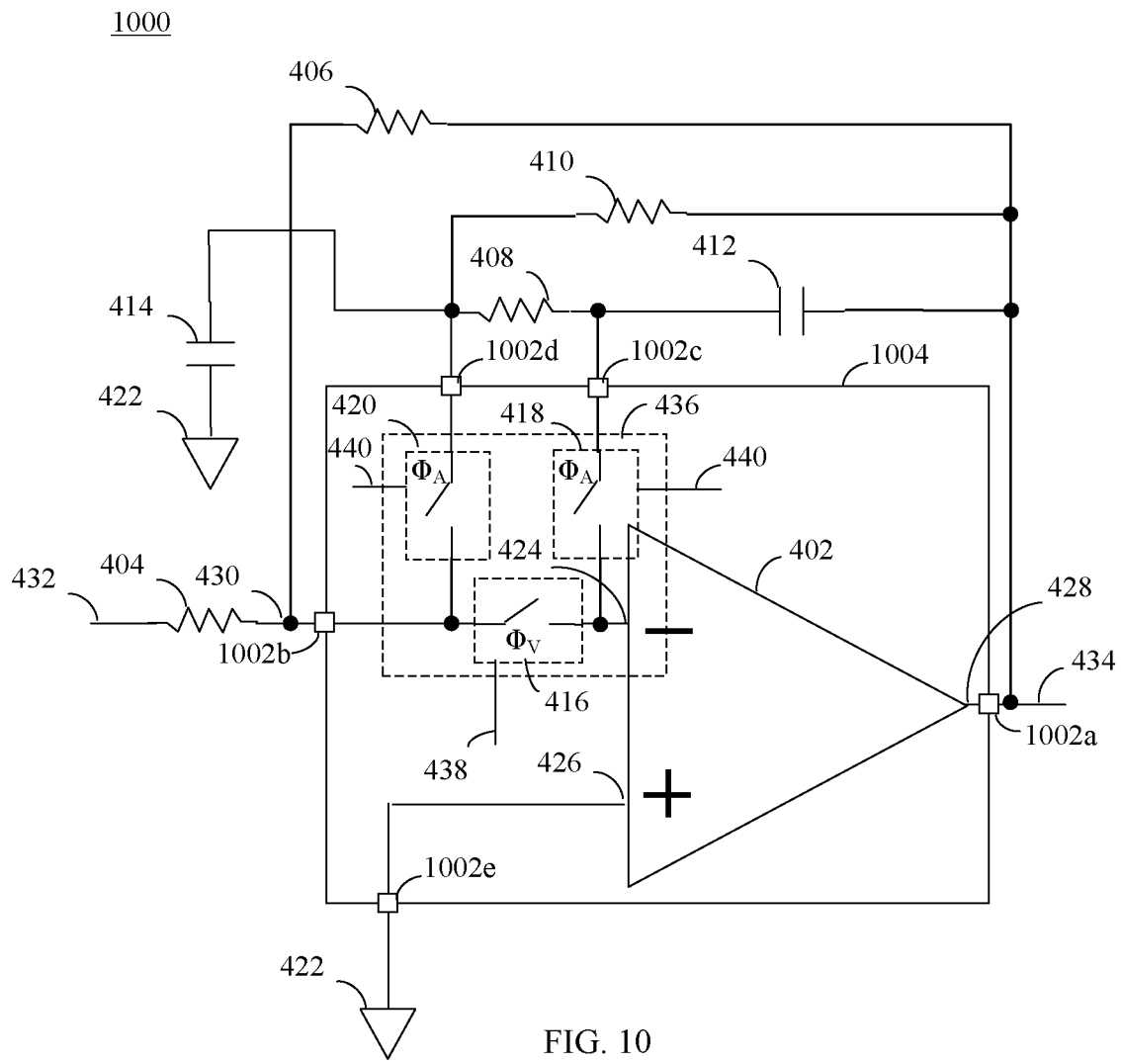
FIG. 10 shows an example line driver circuit chip implementation according to an embodiment of the present invention.

For example, FIG. 10 shows a line driver circuit 1000, which is an example of line driver circuit 400 shown in FIG. 4, according to an embodiment of the present invention. As shown in FIG. 10, line driver circuit 1000 includes an integrated circuit chip 1004. Integrated circuit chip 1004 is formed of a semiconductor material, such as silicon and gallium arsenide, that has amplifier 402 and switch network 436 formed therein, according to a semiconductor fabrication technique (e.g., photolithography). First resistor 404, second resistor 406, third resistor 408, fourth resistor 410, first capacitor 412, and second capacitor 414 are external to chip 1004 (e.g., individually mounted to a circuit board), and interface with chip 1004 at a plurality of input/output (I/O) pads 1002 of chip 1004.

As shown in FIG. 10, first output 428 of amplifier 402 is coupled to a first I/O 1002a of chip 1004. Thus, fourth resistor 410 and first capacitor 412 may be coupled to first I/O pad 1002a. The second terminal of first switch 416 is coupled to a second I/O pad 1002b of chip 1004. Thus, first and second resistors 404 and 406 may be coupled to second I/O pad 1002b. The second terminal of second switch 418 is coupled to a third I/O pad 1002c of chip 1004. Thus, third resistor 408 and first capacitor 412 may be coupled to third I/O pad 1002c. The second terminal of third switch 420 is coupled to a fourth I/O pad 1002d of chip 1004. Thus, third resistor 408, fourth resistor 410, and second capacitor 414 may be coupled to fourth I/O pad 1002d. Second input 426 of amplifier 402 is coupled to a fifth I/O pad 1002e of chip 1004. Although not shown in FIG. 10, first and second control signal phases 438 and 440 may be generated externally to chip 1004, and may interface with chip 1004 at one or more pads 1002. Alternatively, first and second control signal phases 438 and 440 may be generated internally to chip 1004.

Figure 11:
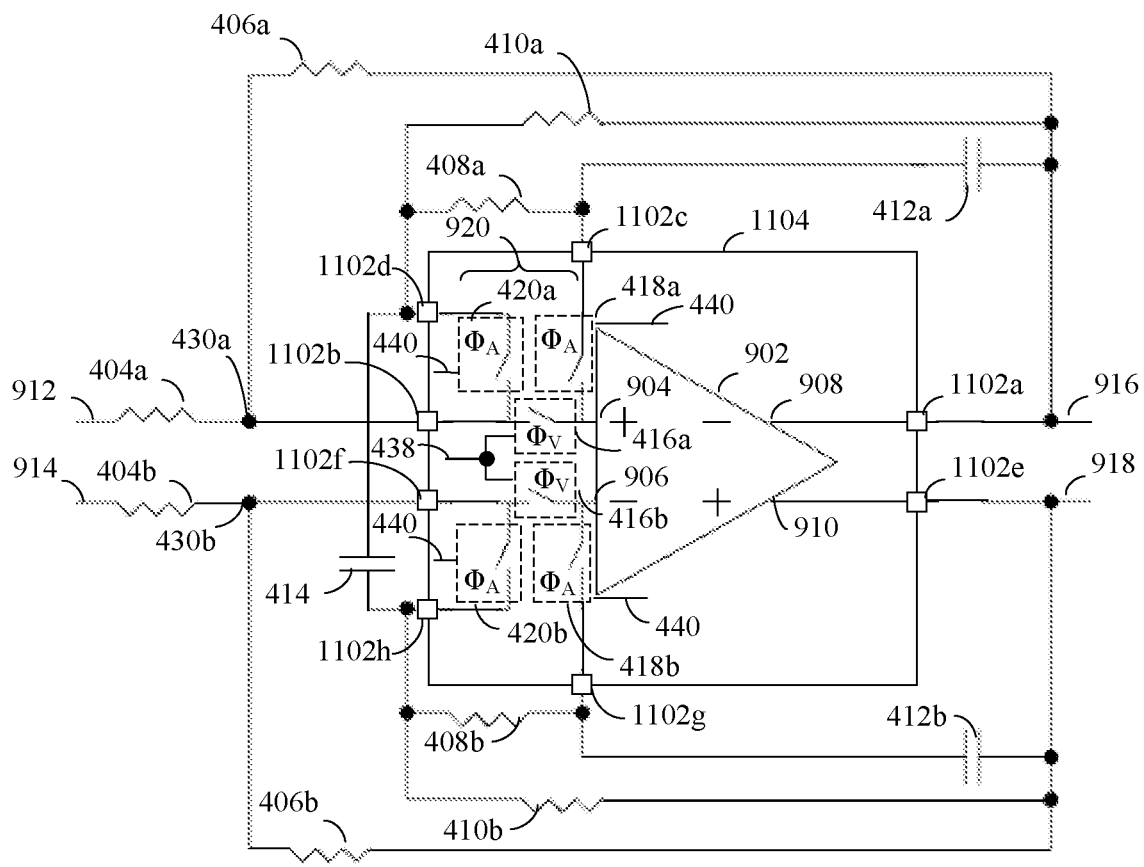
FIG. 11 shows a line driver circuit chip implementation, which is an example of the line driver circuit shown in FIG. 9, according to an example embodiment of the present invention.

FIG. 11 shows a line driver circuit 1100, which is an example of line driver circuit 900 shown in FIG. 9, according to an embodiment of the present invention. As shown in FIG. 11, line driver circuit 1100 includes an integrated circuit chip 1104. Integrated circuit chip 1104 includes a semiconductor material that has amplifier 902 and switch network 920 formed therein. First resistor 404a, second resistor 406a, third resistor 408a, fourth resistor 410a, first capacitor 412a, second capacitor 414, fifth resistor 404b, sixth resistor 406b, seventh resistor 408b, eighth resistor 410b, and third capacitor 412b are external to chip 1104 (e.g., individually mounted to a circuit board), and interface with chip 1104 at a plurality of input/output (I/O) pads 1102 of chip 1104.

As shown in FIG. 11, first output 908 of amplifier 902 is coupled to a first I/O pad 1102a of chip 1104. The second terminal of first switch 416a is coupled to a second I/O pad 1102b of chip 1104. The second terminal of second switch 418a is coupled to a third I/O pad 1102c of chip 1104. The second terminal of third switch 420a is coupled to a fourth I/O pad 1102d of chip 1104. Second output 910 of amplifier 902 is coupled to a fifth I/O pad 1102e of chip 1104. The second terminal of fourth switch 416b is coupled to a sixth I/O pad 1102f of chip 1104. The second terminal of fifth switch 418b is coupled to a seventh I/O pad 1102g of chip 1104. The second terminal of sixth switch 420b is coupled to an eighth I/O pad 1102h of chip 1104. Similarly to FIG. 10, first and second control signal phases 438 and 440 may optionally be generated externally to chip 1104, and may interface with chip 1104 at one or more pads 1102. Resistors 404a, 404b, 406a, 406b, 408a, 408b, 410a, and 410b, and capacitors 412a, 412b, and 414, which are external to chip 1104, are coupled to I/O pads 1102a-1102h accordingly.

The embodiments of FIGS. 10 and 11 provide even further integrated line driver solutions, with amplifiers and switch networks included on chip, and the relatively inexpensive resistors and capacitors implemented externally, such as on a circuit board.

Resistors 404, 406, 408, and 410, and capacitors 412 and 414 may be implemented as any type of resistor and capacitor components, including as surface mount devices, leaded devices, and/or as any other physical component type. Terminals of resistors 404, 406, 408, and 410, and capacitors 412 and 414 may be surface mount pads, pins, leads, or any other type of component terminal. Switches 416, 418, and 420 may each be any type of switch or transistor, such as a CMOS switch or other switch type. When integrated in a chip, the performance of switches 416, 418, and 420 may be improved (relative to non-integrated switches).

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A line driver circuit, comprising:
an amplifier;
a first switch having a first terminal that is coupled to a first input interface of the amplifier;
a second switch having a first terminal that is coupled to the first input interface of the amplifier;
a third switch having a first terminal that is coupled to a second terminal of the first switch, the first switch, the second switch, and the third switch being operable to switch from a first configuration that is a first DSL communication configuration to a second configuration that is a second DSL communication configuration according to at least a first control signal phase of a control signal;
a first resistor having a first terminal coupled to a second terminal of the first switch;
a second resistor coupled between the second terminal of the first switch and a first output interface of the amplifier;
a third resistor coupled between a second terminal of the second switch and a second terminal of the third switch;
a fourth resistor coupled between the second terminal of the third switch and the first output interface of the amplifier;
a first capacitor coupled between the second terminal of the second switch and the first output interface of the amplifier; and
a second capacitor having a first terminal coupled to a second terminal of the third switch.

2. The line driver circuit of claim 1, further comprising:
a fourth switch having a first terminal that is coupled to a second input interface of the amplifier;
a fifth switch having a first terminal that is coupled to the second input interface of the amplifier;
a sixth switch having a first terminal that is coupled to a second terminal of the fourth switch;
a fifth resistor having a first terminal coupled to a second terminal of the fourth switch;
a sixth resistor coupled between the second terminal of the fourth switch and a second output interface of the amplifier;
a seventh resistor coupled between a second terminal of the fifth switch and a second terminal of the sixth switch;
an eighth resistor coupled between the second terminal of the sixth switch and the second output interface of the amplifier; and
a third capacitor coupled between the second terminal of the fifth switch and the second output interface of the amplifier;
wherein the second capacitor has a second terminal coupled to a second terminal of the sixth switch.

3. The line driver circuit of claim 2, wherein the fourth switch receives the first control signal phase of the control signal, and the second switch, the third switch, the fifth switch, and the sixth switch receive a second control signal phase of the control signal.

4. The line driver circuit of claim 3, wherein the first control signal phase is configured to open the fourth switch in a first mode, and to close the fourth switch in a second mode; and
wherein the second control signal phase is configured to open the second switch, the third switch, the fifth switch, and the sixth switch in the second mode, and to close the second switch, the third switch, the fifth switch, and the sixth switch in the first mode.

5. The line driver circuit of claim 4, wherein the first mode is an asymmetric digital subscriber line (ADSL) communication mode, and the second mode is a very high speed digital subscriber line (VDSL) communication mode.

6. The line driver circuit of claim 5, wherein during the ADSL communication mode, an ADSL standard input signal is received at a second terminal of the first resistor and a second terminal of the fifth resistor; and
wherein during the VDSL communication mode, a VDSL standard input signal is received at the second terminal of the first resistor and the second terminal of the fifth resistor.

7. The line driver circuit of claim 2, wherein the first switch, the second switch, the third switch, the fourth switch, the fifth switch, the sixth switch, and the amplifier are included in an integrated circuit chip.

8. A method for driving a digital subscriber line (DSL) signal, comprising:
receiving a mode control signal at a line driver circuit, the mode control signal comprising a first control signal phase;
switching the line driver circuit from a first configuration to a second configuration according to at least the first control signal phase of the received mode control signal, the switching comprising switching at least one switch of a switch network to switch the line driver circuit from a first configuration that is a first DSL communication configuration to a second configuration that is a second DSL communication configuration;
receiving a DSL communication signal at the line driver circuit; and
transmitting the received DSL communication signal from the line driver circuit according to the second configuration.

9. The method of claim 8, further comprising:
switching the line driver circuit from the second configuration to the first configuration according to the received mode control signal;
receiving a second DSL communication signal at the line driver circuit; and
transmitting the received second DSL communication signal from the line driver circuit according to the first configuration.

10. The method of claim 9, wherein the line driver circuit includes a first resistor having a first terminal coupled to a first node and a second resistor coupled between the first node and a first output interface of the amplifier, wherein said switching the line driver circuit from a first configuration to a second configuration according to the received mode control signal comprises:
coupling a first capacitor between a first input interface of the amplifier and the first output interface of the amplifier;
coupling a first terminal of a third resistor to the first node and a second terminal of the third resistor to the first input interface of the amplifier;
coupling a fourth resistor between the first node and the first output interface of the amplifier;
decoupling the first node from the first input interface of the amplifier; and
coupling a first terminal of a second capacitor to the first node.

11. The method of claim 10, wherein said switching the line driver circuit from the second configuration to the first configuration according to the received mode control signal comprises:
decoupling the first capacitor from between the first input interface of the amplifier and the first output interface of the amplifier;
decoupling the first terminal of the third resistor from the first node and the second terminal of the third resistor from the first input interface of the amplifier;
decoupling the fourth resistor from between the first node and the first output interface of the amplifier;
coupling the first node to the first input interface of the amplifier; and
decoupling the first terminal of the second capacitor from the first node.

12. The method of claim 11, wherein the line driver circuit includes a fifth resistor having a first terminal coupled to a second node and a sixth resistor coupled between the second node and a second output interface of the amplifier, wherein said switching the line driver circuit from a first configuration to a second configuration according to the received mode control signal comprises:
coupling a third capacitor between a second input interface of the amplifier and the second output interface of the amplifier,
coupling a first terminal of a seventh resistor to the second node and a second terminal of the seventh resistor to the second input interface of the amplifier,
coupling an eighth resistor between the second node and the second output interface of the amplifier,
decoupling the second node from the second input interface of the amplifier, and
coupling a second terminal of the second capacitor to the second node; and
wherein said switching the line driver circuit from the second configuration to the first configuration according to the received mode control signal comprises
decoupling the third capacitor from between the second input interface of the amplifier and the second output interface of the amplifier,
decoupling the first terminal of the seventh resistor from the second node and the second terminal of the seventh resistor from the second input interface of the amplifier,
decoupling the eighth resistor from between the second node and the second output interface of the amplifier,
coupling the second node to the second input interface of the amplifier, and
decoupling the second terminal of the second capacitor from the second node.

13. The method of claim 8, wherein the received DSL communication signal is an asymmetric digital subscriber line (ADSL) standard signal, wherein said switching comprises:
switching the line driver circuit from a very high speed digital subscriber line (VDSL) communication mode to an ADSL communication mode.

14. The method of claim 13, wherein said switching comprises:
changing a gain of the line driver circuit; and
modifying the line driver circuit to include a low pass filter.

15. The method of claim 8, wherein the received DSL communication signal is a very high speed digital subscriber line (VDSL) standard signal, wherein said switching comprises:
switching the line driver circuit from an asymmetric digital subscriber line (ADSL) communication mode to a VDSL communication mode.

16. The method of claim 15, wherein said switching comprises:
changing a gain of the line driver circuit; and
removing a low pass filter from the line driver circuit.

17. The method of claim 8, wherein the mode control signal further comprises a second control signal phase, the first control signal phase and the second control signal phase being opposing phases, wherein said switching further comprises:
opening a first plurality of switches of a switch network according to the first control signal phase; and
closing a second plurality of switches of the switch network according to the second control signal phase.

18. A driver for driving a digital subscriber line (DSL) signal, comprising:
a line driver circuit configurable
to receive a mode control signal that comprises a first control signal phase,
to receive a DSL communication signal, and
to transmit the received DSL communication signal according to a second configuration; and
a plurality of switches of a switch network configurable to switch the line driver circuit from a first DSL communication configuration to a second DSL communication configuration according to the received mode control signal by switching one or more of the plurality of switches according to at least the first control signal phase.

19. The driver of claim 18, wherein said plurality of switches is further configurable to switch the line driver circuit from the second DSL communication configuration to the first DSL communication configuration according to the received mode control signal; wherein the line driver circuit is further configurable to receive a second signal and transmit the received second signal according to the first configuration.

20. The driver of claim 18, wherein the mode control signal further comprises a second control signal phase, the first control signal phase and the second control signal phase being opposing phases, a second plurality of switches of the switch network configurable to switch the line driver circuit from the first DSL communication configuration to the second DSL communication configuration according to the received mode control signal by closing one or more of the second plurality of switches according to the second control signal phase.

* * * * *